United States Patent
Gothier

[19]

[11] Patent Number: 6,116,044
[45] Date of Patent: Sep. 12, 2000

[54] AIR CHUTE ADAPTER FOR REFRIGERATION VEHICLES

[75] Inventor: Richard J. Gothier, Mesa, Ariz.

[73] Assignee: Aero Industries, Inc., Indianapolis, Ind.

[21] Appl. No.: 09/300,407

[22] Filed: Apr. 27, 1999

[51] Int. Cl.$^7$ .................................................. F25D 17/04
[52] U.S. Cl. .............................. 62/407; 62/239; 454/91; 454/118
[58] Field of Search ........................ 62/239, 407; 454/91, 454/118

[56] References Cited

U.S. PATENT DOCUMENTS

| | | | |
|---|---|---|---|
| 3,604,218 | 9/1971 | Cresti | 62/408 |
| 3,792,595 | 2/1974 | Willis | 62/414 |
| 3,805,544 | 4/1974 | Stromblad | 62/413 |
| 3,844,203 | 10/1974 | Takahashi | 98/33 |
| 4,553,403 | 11/1985 | Taylor | 62/239 |
| 4,951,479 | 8/1990 | Araquistain et al. | 62/239 |
| 5,101,643 | 4/1992 | Hicke | 62/407 |
| 5,460,013 | 10/1995 | Thomsen | 62/239 |
| 5,809,798 | 9/1998 | Clarke et al. | 62/408 |
| 5,946,933 | 9/1999 | Clarke et al. | 62/408 |
| 5,947,812 | 9/1999 | Henning et al. | 454/118 |
| 5,987,910 | 11/1999 | Kothe et al. | 62/371 |

OTHER PUBLICATIONS

"Adapters," Aero Industries, Inc., brochure of 1993 (for Thermo King and Carrier Refrigeration Units).
"Carrier Adapters," Aero Industries, Inc., brochured of 1993 (for Carrier Phoenix Advantage, Phoenix Ultra and Thunderbird.
"Aero Industries The Leader in Refrigeration Products," brochure of 1995.

*Primary Examiner*—William Doerrler
*Assistant Examiner*—Mark Shulman
*Attorney, Agent, or Firm*—Laubscher & Laubscher

[57] ABSTRACT

An adapter arrangement is provided for connecting the inlet opening of a cold air distribution chute with the cold air discharge opening of a refrigeration unit that is mounted in a opening contained in the front wall of the body of a refrigeration vehicle, characterized in that the forward portion of the chute is collapsed upwardly upon the application of a vertical force thereto, thereby to prevent tearing or damage of the chute. The bottom edge of the chute inlet opening is connected with a weighted horizontal rod or bar that is guided for vertical sliding movement on vertical guide rods that are mounted by brackets on opposite sides of the cold air discharge opening of the refrigeration unit. Each end of the horizontal rod is connected with the associated guide rod by a connecting member that is telescopically slidably connected with the rod.

15 Claims, 6 Drawing Sheets

AIR CHUTE ADAPTER FOR REFRIGERATION VEHICLES

SPECIFICATION

BACKGROUND OF THE INVENTION

1. Field of the Invention

An adapter arrangement is provided for connecting the front inlet opening of a cold air distribution chute with the cold air discharge opening of a refrigeration unit mounted in an opening contained in the front wall of the body of a refrigeration vehicle, characterized by the provision of means that permit the collapse of the forward portion of the chute upon the application of an upwardly directed force thereto, thereby to prevent tearing or damage of the chute.

2. Brief Description of the Prior Art

It is well known in the prior art to provide distribution chutes within the body of a refrigeration vehicle in order to circulate cold air around the cargo that is to be refrigerated and which is normally supported on pallets. Generally, the distribution chute is flexible and is formed from a suitable impermeable synthetic plastic material, a woven fabric material, or the like. One problem that often occurs is the damage that is caused to the chute by the cargo handlers, particularly during return runs of the refrigeration vehicle when the loaders attempt to load a maximum amount of dry nonrefrigerated goods into the refrigeration body by the use of fork lift truck, especially adjacent the front wall of the body. It became apparent, therefore, that there is a need for an adapter for refrigeration air chutes which, if hit by the cargo. would allow the air chute intake portion to be pushed up out of the way of the cargo so that the chute head would not become damaged.

SUMMARY OF THE INVENTION

Accordingly, a primary object of the present invention is to provide an adapter arrangement for connecting the inlet opening of a cold air distribution chute with the discharge opening of a front-wall-mounted refrigeration unit which allows the air chute head to be pushed up out of the way when engaged by the cargo load, and which will return automatically to its original condition for the necessary air flow when the application of the load force is removed.

According to a more specific object of the invention, the bottom edge of the chute inlet opening is connected with a horizontal rod or bar that is guided at its ends for vertical movement relative to a pair of vertical guide rods that are mounted on brackets that are fastened to the front wall on opposite sides of the refrigeration unit discharge opening. Preferably, the ends of the rods are connected with the guide rods by connecting members that are telescopically slidably connected with the ends of the horizontal rod, respectively. In this manner, upon the application of an angularly upwardly directed force upon the chute, the horizontal rod may be pivoted to an inclined position without locking up and subsequently preventing return of the weighted rod to its original horizontal position. The adapters may be combined with air chutes and bulkheads for maximum air circulation and maximum load cooling efficiency.

Another object of the invention is to provide an air chute adapter which will permit twisting and turning while the horizontal rod is going up and down. By making the rod of tubular configuration with telescoping end connector members, the connectors are permitted to telescope in and out as well as to be rotated the moment that there is an resistance between the adapter and the vertical guide rods.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
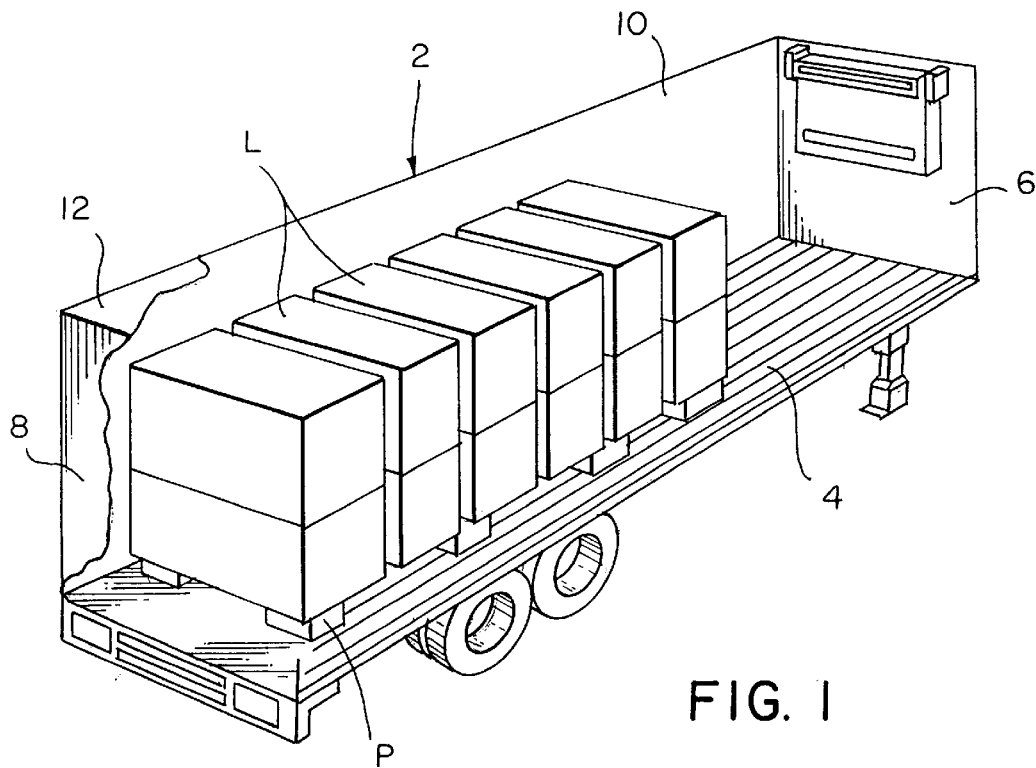
FIG. 1 is a partially broken away rear perspective view of a refrigeration trailer with which the present invention is used.
Figure 2:
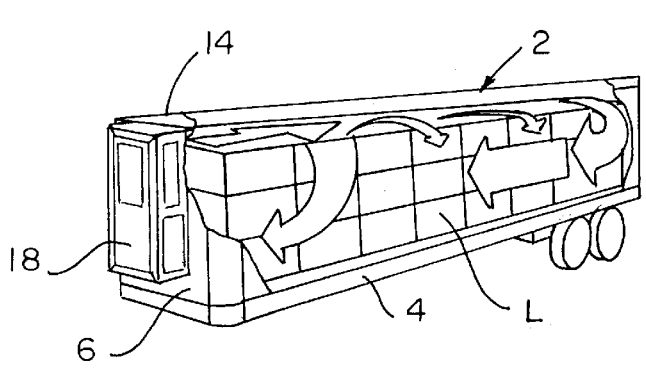
FIG. 2 is a front perspective view illustrating the manner in which the refrigeration unit is connected with the front wall of a refrigeration trailer.

Referring first more particularly to FIGS. 1 and 2, the refrigeration trailer 2 includes a horizontal bottom wall or platform 4, front and rear walls 6 and 8, a pair of side walls 10, and a top wall or roof 12. As is known in the art, the front wall 6 contains an opening 14 for receiving the cold air evaporator 16 of a refrigeration unit 18 that is mounted on the front wall 6. The chute means of the present invention serves to distribute the cold air throughout the articles of load L that are normally supported by pallets or spacers P as shown in FIG. 1.

Figure 4:
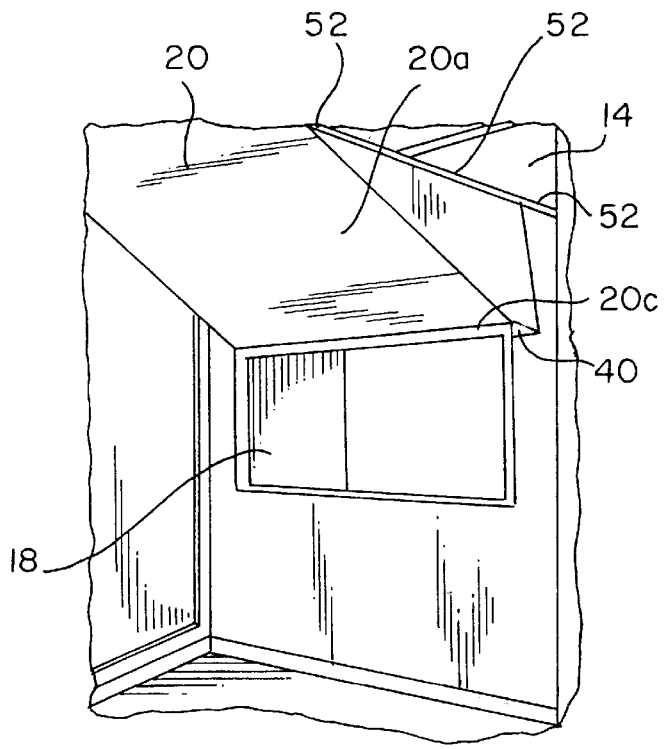
FIGS. 4 and 5 are detailed perspective views illustrating the manner in which the chute adapter means of the present invention is operated from its normal condition to a collapsed condition upon the application of an upwardly-directed vertical force thereto.
Figure 5:
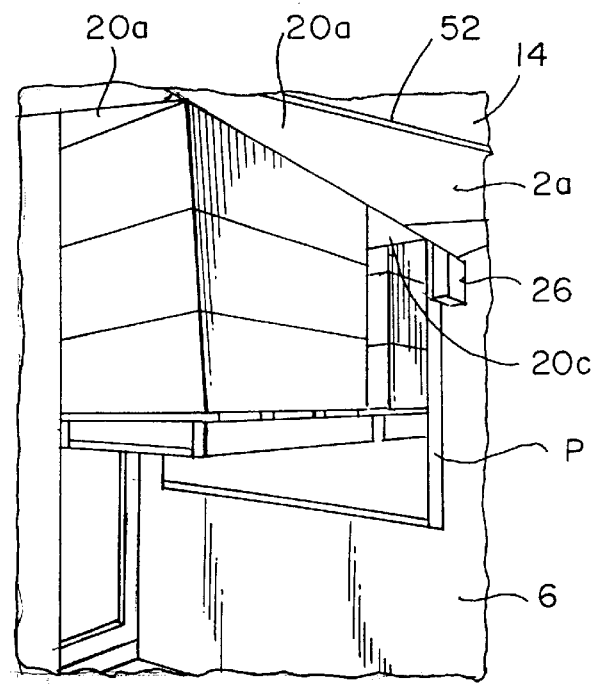

Referring now to FIG. 4, the cold air distribution chute 20 is secured to the interior surface of the top wall 14 and extends longitudinally of the refrigeration body 2. At its forward end portion 20a, the chute contains an inlet opening 20b (FIG. 9) that is connected with the interior surface of the front wall 6 by the adapter means of the present invention. As will be explained in greater detail below, in accordance with the present invention, the forward end portion 20a of the chute 20 is designed to collapse upwardly upon the application of an upwardly-directed vertical force thereto, as shown in FIG. 5, and as will be explained in greater detail below.

Referring to FIGS. 6–11, the adapter means 24 serves to connect the inlet opening of the chute 20 with the interior surface of the front wall 6 in circumferentially surrounding relation relative to the refrigeration duct 16. The adapter means include a pair of mounting brackets 26 that are fastened by a plurality of screws 28 with the front wall 6 of the refrigeration body.

Figure 6:
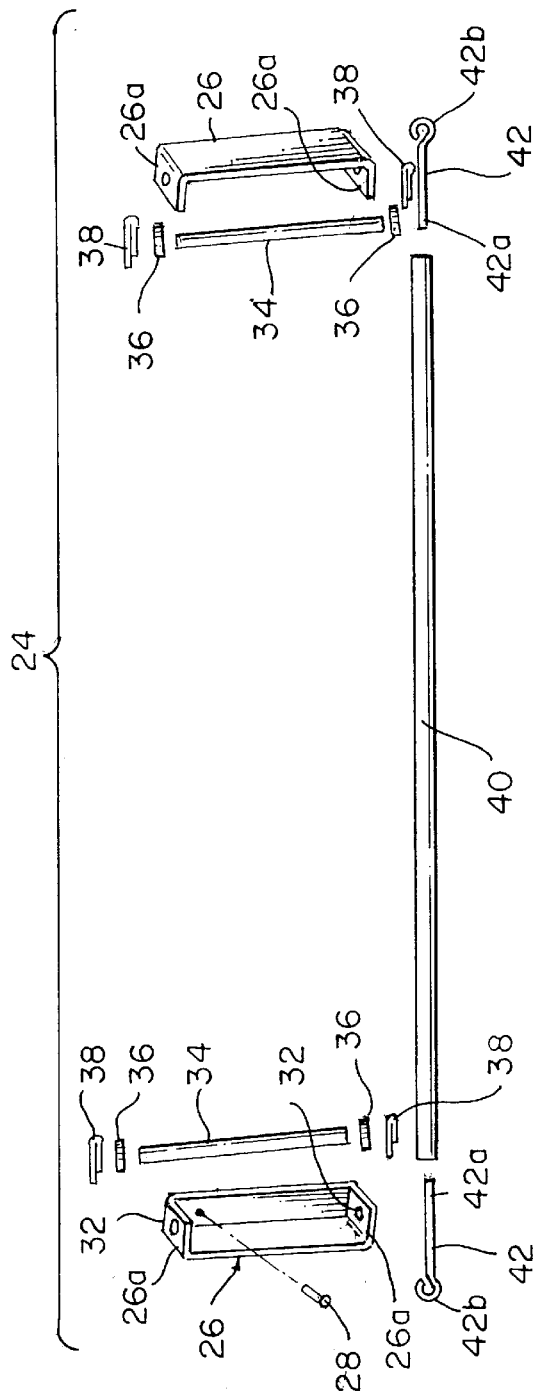
FIG. 6 is an exploded view of the chute adapter means of the present invention.
Figure 11:
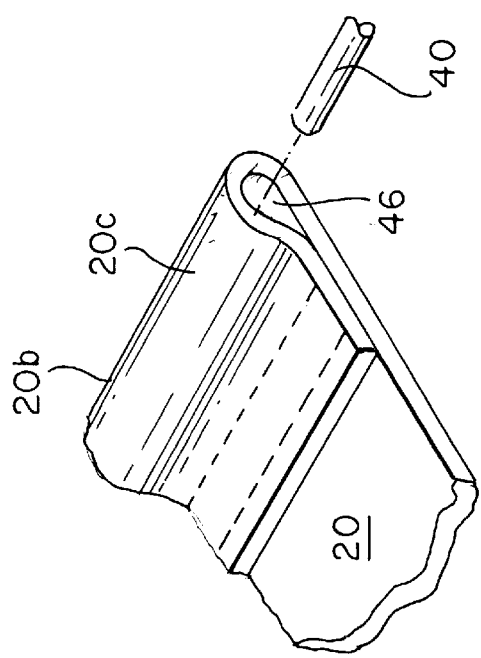

As shown in FIG. 6, the mounting brackets 26 are formed from folded sheet metal, such as aluminum or molded synthetic plastic material, and include a pair of vertically spaced horizontal portions 26a that contain vertically aligned openings 32 for slidably receiving guide rods 34, respectively. The guide rods are provided at their ends with stop washers 36 and cotter pins 38 that prevent vertical movement of the guide rods 34 relative to the mounting brackets 26. Arranged between the vertical guide rods 34 is a horizontal weighted tubular rod 40. The weighted rod 40 is connected at each end for sliding movement relative to the vertical guide rods 34 by a pair of connecting members 42, respectively. Each connecting member 42 includes a shank portion 42a that is telescopically slidably mounted within the associated end of the tubular weight rod 40, and at the other end with an eyelet portion 42b having an opening that slidably receives the associated vertical guide rod 34. As shown in FIG. 11, the bottom end of the chute inlet opening 20b includes a reversely folded stitched seam 20c that defines a longitudinal passage 46 that receives the weighted rod 40. Thus, as will be described in greater detail below, upon vertical movement of the horizontal rod 40 relative to the stationery vertical guide means 34, the associated folded seam portion 20c of the chute inlet opening 20b will be displaced vertically relative to the vehicle front wall 6.

Figure 3:
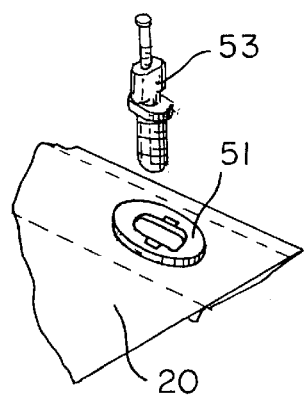
FIG. 3 is a perspective view of turn fastener means for connecting the chute with the interior lower surface of the roof of the refrigeration body.
Figure 12:
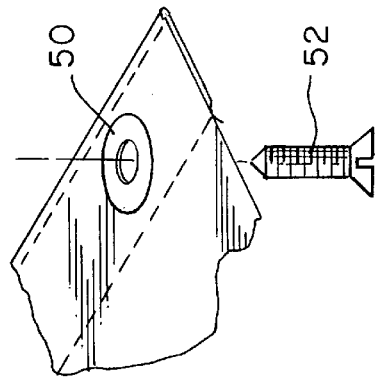
FIG. 12 illustrates the means by which the body portion of the chute is connected with the roof or top wall of the refrigeration body.
Figure 7:
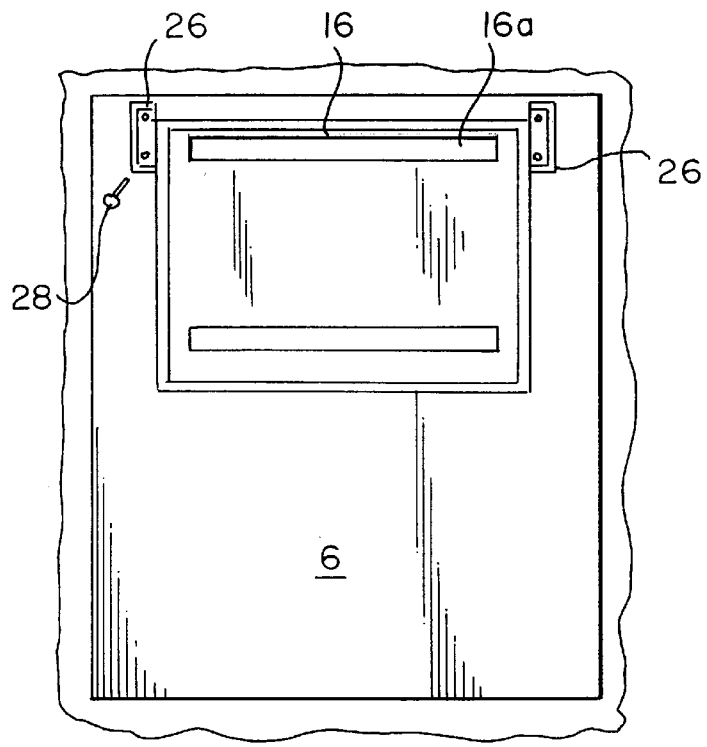
FIGS. 7–11 illustrate the manner in which the adapter assembly is used to connect to the chute inlet opening with the front wall of the refrigeration body.
Figure 8:
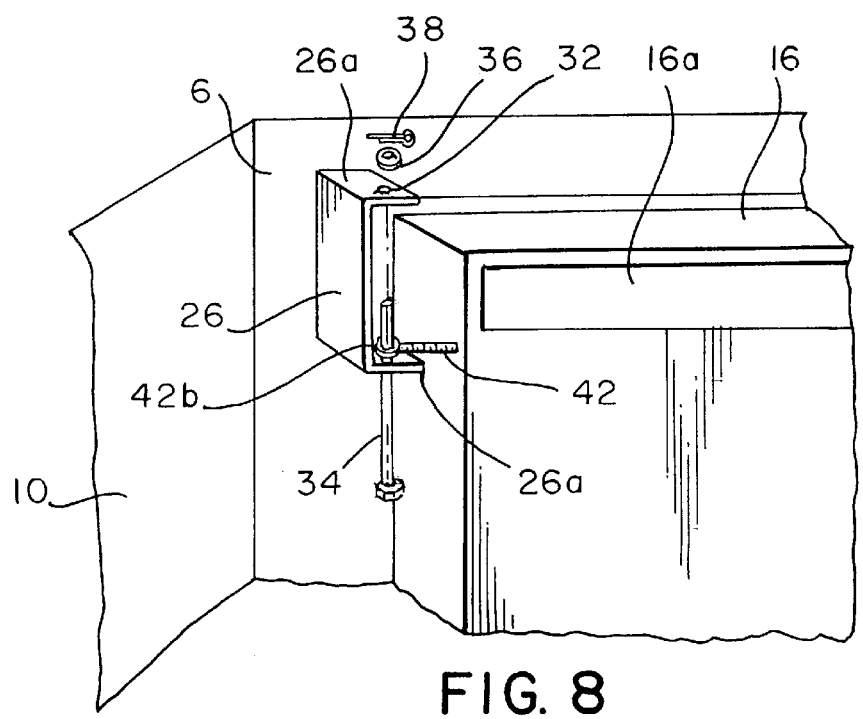
Figure 10:
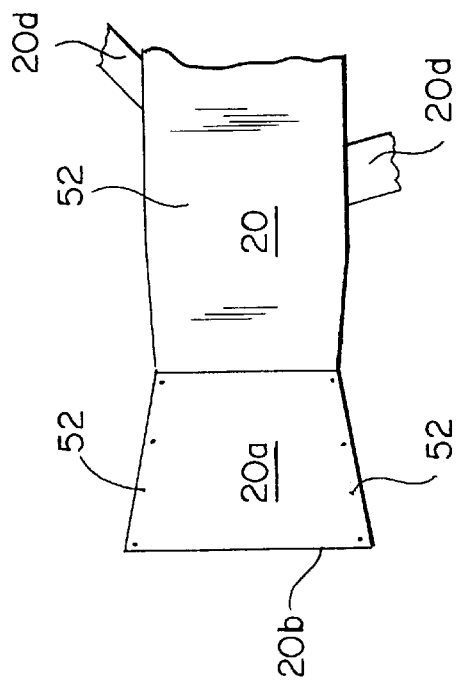
Figure 9:
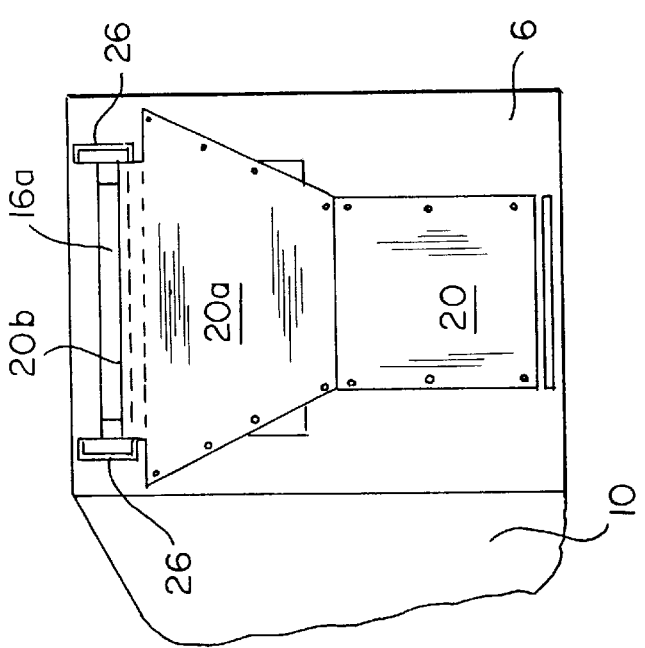
Figure 13:
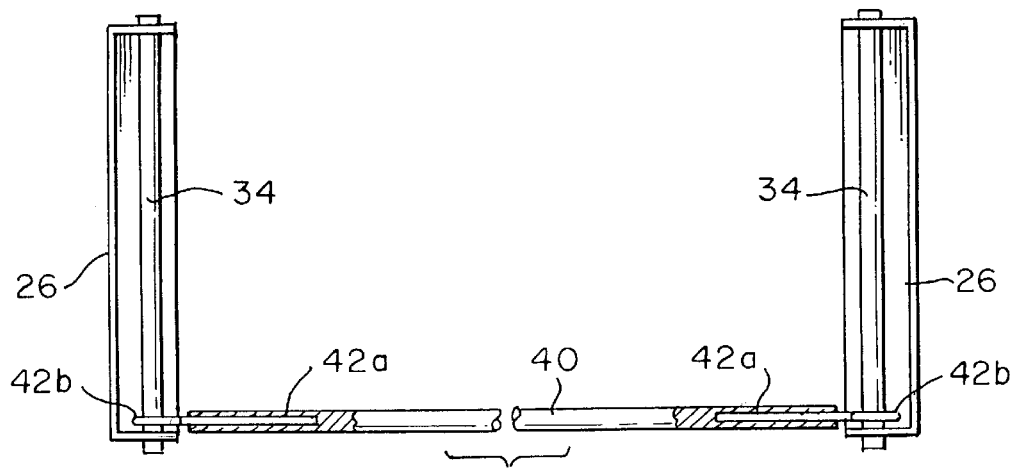
FIGS. 13–15 illustrate the operation of the chute adapter means upon the application of vertical and angularly applied forces, respectively, to the lower surface of the forward end of the cold air distribution chute.
Figure 14:
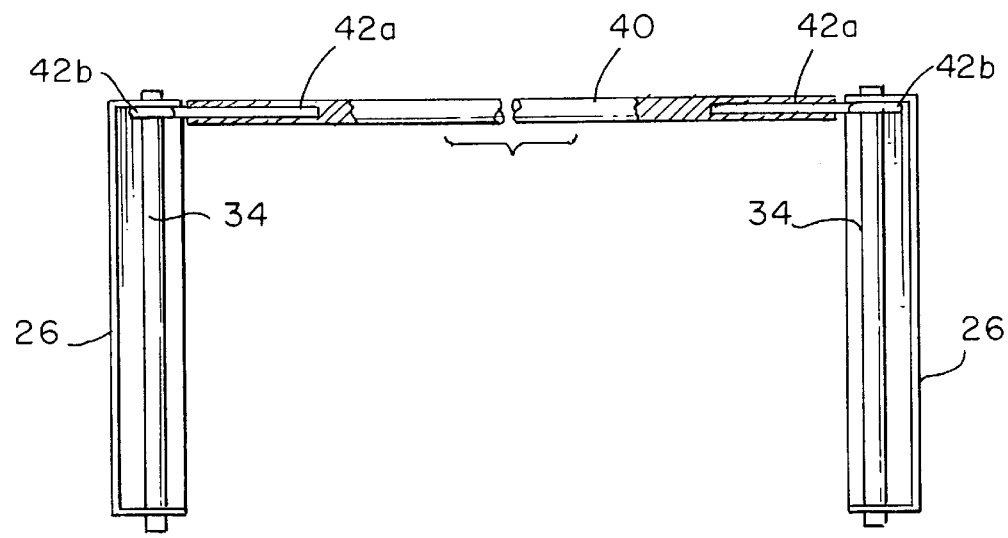
Figure 15:
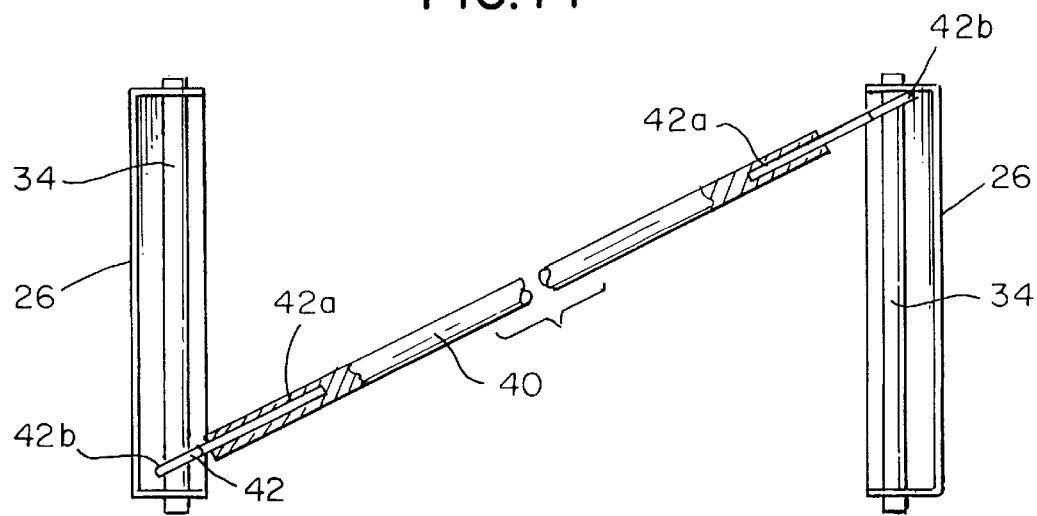

To assemble the chute to the interior surface of the refrigeration body 2, the chute is arranged longitudinally on the platform bottom wall 4 with the inlet opening end 20b adjacent the front wall 6, whereupon the weighted rod 40 is inserted through the opening 46 defined by the folded seam 20c. The straight shank portions 42a of the connecting members 42 are then inserted telescopically within the ends of the weighted rod 40, and the guide rods 34 are inserted upwardly through the opening in the eyelet portions 42b as shown in FIG. 8. The guide rods 34 are fastened in place by the washers 36 and the cotter pin 38. Referring to FIG. 9, the upper inlet portion of the forward portion 20a of the chute 20 is then lifted upwardly, and the forward portion 20a is secured to the interior surface of the top wall 14 by means of grommets 50 (FIG. 12) arranged in longitudinally spaced relation to the chute 20, and screw fastener means 52. Alternatively, as shown in FIG. 3, the chute could be connected with the roof by conventional elliptical grommets 51 and cooperating turn fasteners 53. The chute includes longitudinally spaced discharge openings 20d (FIG. 10) for effecting the distribution of the cold air among the load components L as shown by the arrows in FIG. 3. The remainder of the chute is secured to the roof by the turn fastener means of FIG. 3, or by the grommets and the screw fasteners of FIG. 12.

Referring now to FIGS. 5 and 13–15, the adapter means of the present invention is collapsible, thereby to protect the forward portion 20a of the chute 20 by the load cargo. Quite often, the pallets containing the load are elevated by fork lift trucks, thereby to cause vertical engagement of the top of the load with the bottom of the chute front portion 20a. In accordance with the present invention, when the top surface of the load L engages the bottom surface of the cover front portion 20a, the rod 40 is displaced upwardly from its normal position of FIG. 13 relative to the guide rods 34 toward the elevated position shown in FIGS. 5 and 14. Upon release of the upwardly directed force upon the under surface of the chute forward portion 20a, the weighted rod 40 falls by gravity toward its initial horizontal position of FIG. 13, thereby returning the folded seam portion 20c to its initial position beneath the refrigeration discharge opening 16a.

In accordance with an important feature of the invention, in the event that the upwardly-directed force is angularly applied to the under surface of the forward portion 20a of the chute 20, owing to the telescopic connection between the linear shank portions 42a of the connecting members 42 and the hollow weight rod 40, one end of the rod 40 may be displaced upwardly relative to the other end. Thus, the connecting members 42 are telescopically connected for independent operation relative to each other, thereby to permit the tilted motion of the rod 40 without binding. Upon release of the upwardly directed force from the chute forward portion 20a, owing to the weight of the rod 40, the higher end of the rod will fall by gravity toward the horizontal position of FIG. 13, with the associated connecting member 42 being telescopically introduced within the corresponding end of the weighted rod 40. Thus, the adapter means 24 is operable upon the application of various vertical forces to protect the chute against damage, and will return to its initial position without binding of the horizontal rod 40.

Preferably the chute is formed of an impermeable synthetic plastic sheet or fabric, and the components of the adapter assembly are formed of aluminum or other light weight material. Of course, the horizontal rod may be formed of galvanized pipe, steel or the like in order to increase the weight thereof.

While in accordance with the provisions of the patent statutes, the preferred forms and embodiments of the invention have been illustrated and described, it will be apparent to those skilled in the art that various changes and modifications may be made without deviating from the inventive concepts set forth above.

What is claimed is:

1. Adapter means for connecting the inlet opening of a flexible cold air distribution chute arranged within the body of a refrigeration vehicle with the cold air discharge opening of a refrigeration unit that is externally mounted on the vertical front wall of the refrigeration vehicle body and extends through an opening contained in the front wall, the refrigeration unit including an outlet opening that communicates with the interior of the refrigeration body, comprising:

(a) a pair of vertical guide members;
   (b) means for connecting said vertical guide members with the interior surface of the refrigeration body front wall on opposite sides of the refrigeration unit discharge opening;
   (c) an elongated horizontally-arranged weight member extending between said vertical guide members;
   (d) a pair of connecting means connecting the ends of said weight member for vertical movement relative to said guide means, each of said connecting means including a connecting member that is connected for longitudinal sliding movement relative to said horizontal weight member; and
   (e) means for connecting the chute inlet opening concentrically about said refrigeration unit discharge opening, said chute inlet opening connecting means including means for connecting the lower portion of said the chute inlet opening with said horizontal weight member, whereby upon the application of an upwardly-directed force upon the lower surface of the chute adjacent the chute inlet opening, the horizontal weight bar and the adjacent portions of the chute are displaced upwardly relative to said vertical guide means.

2. Adapter means as defined in claim 1, wherein at least the end portions said horizontal weight member are hollow and extend through a folded seam formed in the bottom portion of the chute inlet opening, said connecting members including adjacent linear first end portions that are telescopically slidably mounted in opposite ends of said weight member.

3. Adapter means as defined in claim 2, wherein said connecting members have remote second ends that contain apertures that slidably receive said vertical guide members.

4. Adapter means as defined in claim 3, wherein said connecting member second ends comprise eye means.

5. Adapter means as defined in claim 4, wherein said vertical guide means comprise a pair of guide rods that extend through said apertures contained in said connecting members, respectively.

6. Adapter means as defined in claim 1, wherein said vertical guide means comprise a pair of guide rods; and further including a pair of mounting brackets supporting said guide rods, respectively.

7. Adapter means as defined in claim 6, wherein each of said mounting brackets includes a pair of vertically spaced horizontal tab portions containing aligned openings receiving the ends of the associated one of said guide rods, respectively, and removable cotter pin means cooperating with corresponding openings contained in the upper and lower extremities of said guide rods for preventing vertical displacement of said guide rods relative to said mounting bracket, respectively.

8. Cold air distribution means for distributing cold air throughout the interior of a refrigeration vehicle body from the discharge opening of a refrigeration unit mounted in an opening contained in the vertical front wall of the body, comprising:

(a) a cold air distribution chute formed of a flexible material and having an inlet opening and a plurality of outlet openings;
   (b) means for mounting said distribution chute on the interior surface of the top wall of the refrigeration body with said chute inlet opening being arranged adjacent the body front wall, and with said outlet openings being arranged in longitudinally spaced relation relative to said refrigeration body; and
   (c) adapter means for connecting said chute opening with the front wall concentrically about the refrigeration unit discharge opening, including:
      (1) a pair of vertical guide members;
      (2) means for connecting said vertical guide members with the interior surface of the refrigeration body front wall on opposite sides of the refrigeration unit discharge opening;
      (3) a horizontal weight member extending between said vertical guide members;
      (4) a pair of connecting means connecting the ends of said weight member for vertical movement relative to said guide means, each of said connecting means including a connecting member that is connected for longitudinal sliding movement relative to said horizontal weight member; and
      (5) means for connecting said chute inlet opening concentrically about said refrigeration unit discharge opening, said chute inlet opening connecting means including means for connecting the lower portion of said the chute inlet opening with said horizontal weight member, whereby upon the application of an upwardly-directed force upon the lower surface of said chute adjacent said chute inlet opening, the horizontal weight bar and the adjacent portions of the chute are displaced upwardly relative to said vertical guide means.

9. Cold air distribution means as defined in claim 8, wherein said weight member comprises a hollow rod.

10. Cold air distribution means as defined in claim 9, wherein said chute opening has a bottom edge portion that includes a reversely-folded seam which defines a through passage, said hollow rod extending through said passage.

11. Adapter means as defined in claim 10, wherein the remote ends of the connecting members contain apertures that slidably receive said vertical guide members.

12. Adapter means as defined in claim 11, wherein each of said connecting member remote ends comprise eye means.

13. Adapter means as defined in claim 12, wherein said vertical guide means comprise a pair of guide rods that extend through the apertures contained in said eye means, respectively.

14. Adapter means as defined in claim 13, wherein said vertical guide means comprise a pair of guide rods; and further including a pair of mounting brackets supporting said guide rods, respectively, and means for securing said mounting brackets with the body front wall.

15. Adapter means as defined in claim 14, wherein each of said bracket means includes a pair of vertically spaced horizontal tab portions containing aligned openings receiving the ends of the associated one of said guide rods, respectively, and removable cotter pin means cooperating with corresponding openings contained in the upper and lower extremities of said guide rods for preventing vertical displacement of said guide rods relative to said bracket means, respectively.

* * * * *